UNITED STATES PATENT OFFICE.

GUSTAVUS MICHAELIS, OF ALBANY, NEW YORK, ASSIGNOR OF ONE-HALF TO WILLIAM T. MAYER, OF SAME PLACE.

COLLODION.

SPECIFICATION forming part of Letters Patent No. 556,017, dated March 10, 1896.

Application filed September 13, 1895. Serial No. 562,463. (No specimens.)

*To all whom it may concern:*

Be it known that I, GUSTAVUS MICHAELIS, of Albany, in the county of Albany and State of New York, have invented or discovered a new and useful Improvement in Collodion, of which the following is a specification.

Methylic ether has a powerful solvent property for certain substances. Absorbed by certain liquids it imparts a solvent property to the same or greatly increases their solvent properties.

The value of methylic ether for imparting a solvent property to a liquid or increasing the solvent property of a liquid is perhaps greatest when methylic ether is used with methylic alcohol. A solution of methylic ether in methylic alcohol will, for example, have a very powerful property of dissolving gun-cotton, or at least that kind which heretofore has been commonly known as "pyroxyline." A solution of gun-cotton thus made will yield upon evaporation a cohesive film capable of use for medicinal purposes, as well as in the arts generally, including the art of photography, providing the solution of gun-cotton shall have been sensitized.

To give a more detailed illustration, I may make a mixture of sulphuric acid and methylic alcohol of about equal parts, subject the same to distillation at a low temperature, and lead the gases thus produced into a cooling apparatus to remove condensible by-products as much as possible, and then into a solution of caustic alkali to remove sulphur dioxide and carbonic acid, then over calcium chloride to eliminate traces of water, and, finally, into methylic alcohol or liquids productive of the same feature. The cheapness of methylic alcohol makes it desirable, in addition to its great solvent properties, when used with methylic ether. I allow the gas obtained as above described to enter such liquid and become absorbed by it, thus finally obtaining a solution containing the gas in liquid form.

Collodion may be made by dissolving gun-cotton, or at least that kind which has been commonly termed "pyroxyline," in methylic alcohol containing methylic ether. By the term "gun-cotton" I wish to include all gun-cottons and analogous materials which are soluble in this mixture. Celluloid or analogous material may be dissolved by the same means. Any of these solutions may be made in the manner commonly pursued in making solutions of gun-cotton, or of celluloid, or analogous material with other solvents.

What I claim as new, and desire to secure by Letters Patent, is—

1. The process of making collodion, consisting in dissolving gun-cotton with methylic alcohol containing methylic ether, substantially as set forth.

2. The process of making collodion, which consists in dissolving gun-cotton in a liquid containing methylic ether.

3. Collodion consisting of gun-cotton dissolved in methylic alcohol and methylic ether, substantially as set forth.

4. Collodion consisting of gun-cotton dissolved in a liquid containing methylic ether.

In testimony whereof I have signed my name to this specification in the presence of two subscribing witnesses.

GUSTAVUS MICHAELIS.

Witnesses:
ANTHONY GREF,
JAC. KLEMANN, Jr.